United States Patent
Borke

(10) Patent No.: US 7,430,467 B2
(45) Date of Patent: Sep. 30, 2008

(54) REGULATING METHOD FOR A MOTOR VEHICLE SEAT

(75) Inventor: Danny Borke, Gammelsdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 11 days.

(21) Appl. No.: 11/525,894

(22) Filed: Sep. 25, 2006

(65) Prior Publication Data

US 2007/0043493 A1   Feb. 22, 2007

Related U.S. Application Data

(63) Continuation of application No. PCT/EP2005/002516, filed on Mar. 10, 2005.

(30) Foreign Application Priority Data

Mar. 26, 2004   (DE)   .................  10 2004 015 047

(51) Int. Cl.
 *G06F 17/00* (2006.01)
(52) U.S. Cl. .............. 701/49; 701/36; 701/45; 177/1; 177/13; 177/144; 280/735; 340/5.53
(58) Field of Classification Search .......... 701/36, 701/45, 49; 177/1, 25.13, 144; 180/273; 280/735; 340/5.53
See application file for complete search history.

(56) References Cited

U.S. PATENT DOCUMENTS

| 6,450,530 | B1 | 9/2002 | Frasher et al. |
| 2003/0056997 | A1 | 3/2003 | Breed et al. |
| 2007/0262574 | A1 * | 11/2007 | Breed et al. ................. 280/735 |

FOREIGN PATENT DOCUMENTS

| DE | 3615210 A1 | 11/1987 |
| DE | 3615216 A1 | 11/1987 |
| DE | 195 22 897 A1 | 1/1997 |
| DE | 197 57 595 C2 | 7/1999 |
| DE | 199 43 484 A1 | 3/2001 |
| DE | 100 03 220 A1 | 8/2001 |
| DE | 202 04 644 U1 | 5/2003 |
| DE | 102 46 318 A1 | 4/2004 |
| EP | 1 069 001 A1 | 1/2001 |
| GB | 2 072 881 A | 10/1981 |

OTHER PUBLICATIONS

International Search Report dated Jul. 5, 2005, including an English translation of the pertinent portion (Four (4) pages).
German Search Report dated Jun. 2, 2004, including an English translation of the pertinent portion (Eight (8) pages).

* cited by examiner

*Primary Examiner*—Khoi H. Tran
*Assistant Examiner*—McDieunel Marc
(74) *Attorney, Agent, or Firm*—Crowell & Moring LLP

(57) ABSTRACT

A regulating method is provided for a motor vehicle seat. According to the method, the ideal seat position data associated with a vehicle user is recorded in a seat data memory. The respective vehicle user is identified by use of an identification device, and the ideal seat position data of the user is associated therewith. The actual seat position is determined by use of a stereoscopic optical element with an associated image data computer. The seat adjustments are carried out in such a way that the actual seat position corresponds at least approximately to the ideal seat position.

14 Claims, 1 Drawing Sheet

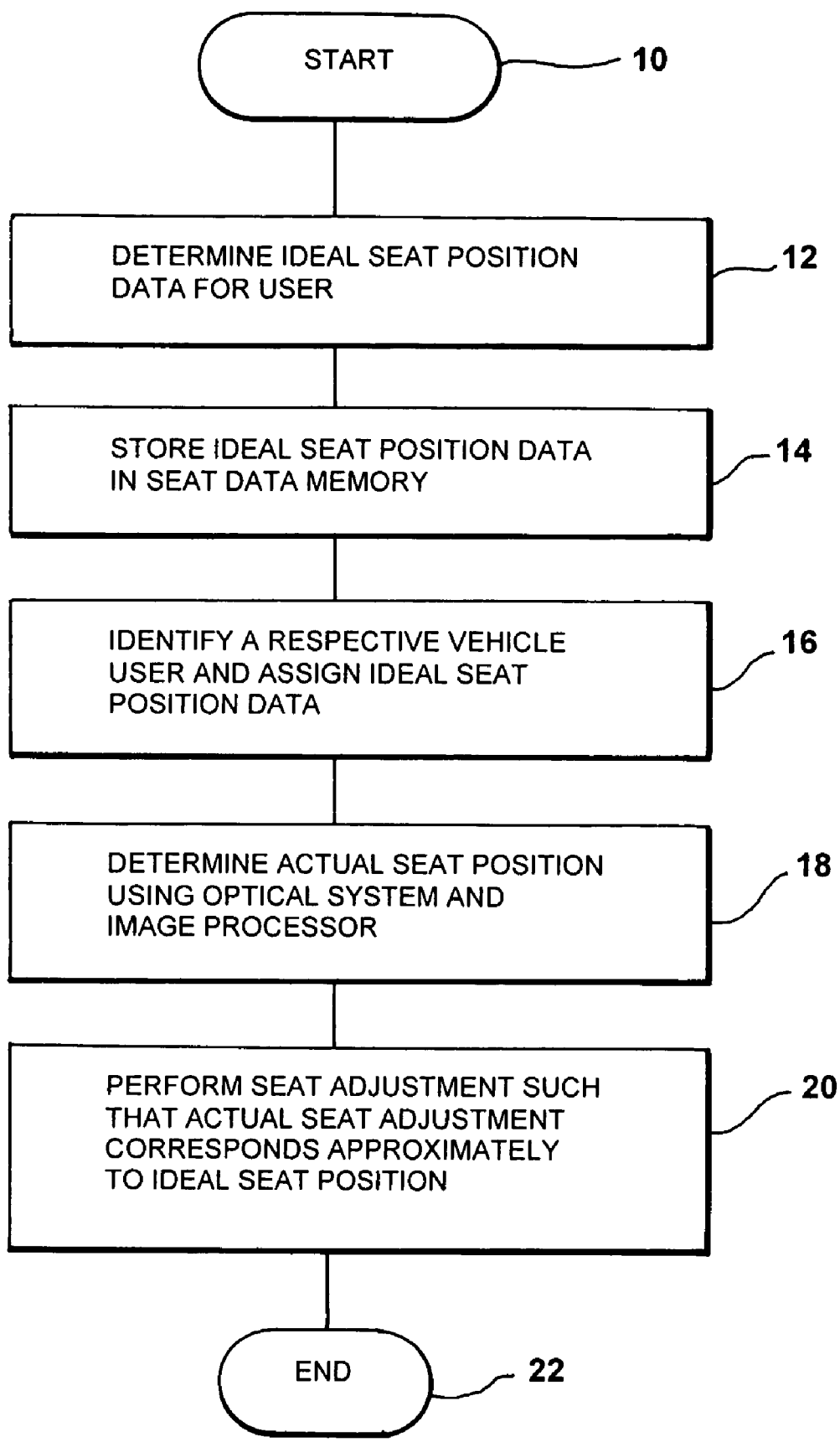

REGULATING METHOD FOR A MOTOR VEHICLE SEAT

CROSS-REFERENCE TO RELATED APPLICATIONS

This application is a continuation of PCT International Application No. PCT/EP2005/002516, filed on Mar. 10, 2005, which claims priority under 35 U.S.C. §119 to German Application No. 10 2004 015 047.8, filed Mar. 26, 2004, the entire disclosures of which are expressly incorporated by reference herein.

BACKGROUND OF THE INVENTION

The invention relates to an adjusting method for a motor vehicle seat.

In modern motor vehicles, particularly in the case of passenger cars of the top and luxury class, a so-called seat memory is known in which the selected seat adjustment is to be stored in a seat data memory for a later reconstruction, and is to be readjusted at any time by use of an individual selection switch. In this regard, reference is made to the adjusting methods described in British Patent document GB 20 72 881 A (having a U.S. counterpart U.S. Pat. No. 4,404,632), and German Patent documents DE 36 15 210 A1, DE 36 15 216 A1, and DE 195 22 897 A1.

SUMMARY OF THE INVENTION

German Patent Application DE 102 46 318.2, which is not a prior publication, relates to a geometrical change of the vehicle seat, which necessarily occurs over the service life of a passenger car and which becomes noticeable, for example, as a settling of the seat upholstery and/or a lasting deformation of the seat frame. As the service life increases, the automatically retrieved and implemented seat adjustment will correspond less and less to the originally recorded and stored seat adjustment. For this purpose, geometrical data of the 3 D surface contour of the vehicle occupant and of the vehicle seat are determined when the vehicle seat is occupied and are reduced to significant person-related position data of the vehicle seat.

It is an object of the present invention to provide a seat adjusting method which has a simple method of operation while its operational safety is high.

According to the invention, this object is achieved by an adjusting method for a motor vehicle seat by which ideal seat position data assigned to a vehicle user are provided in a seat data memory and by which, in addition, the respective vehicle user is identified by use of an identification device wherein the vehicle user's ideal seat position data are assigned to him. The actual seat position is determined by use of a stereoscopic lens system having an assigned image data computer. Seat adjustments are implemented such that the actual seat position determined by use of the stereoscopic lens system corresponds at least approximately to the ideal seat position.

BRIEF DESCRIPTION THE DRAWING

The FIGURE is a flow chart illustrating the adjusting method according to the present invention.

DETAILED DESCRIPTION OF THE DRAWING

It is an object of the present invention to provide a seat adjusting method which has a simple method of operation while its operational safety is high.

According to the invention, this object is achieved by an adjusting method for a motor vehicle seat by which ideal seat position data assigned to a vehicle user are provided in a seat data memory and by which, in addition, the respective vehicle user is identified by use of an identification device wherein the vehicle user's ideal seat position data are assigned to him. The actual seat position is determined by use of a stereoscopic lens system having an assigned image data computer. Seat adjustments are implemented such that the actual seat position determined by use of the stereoscopic lens system corresponds at least approximately to the ideal seat position.

The invention differs in several aspects from the known seat adjusting methods or from the seat adjusting methods of previous applications.

On the one hand, ideal seat position data assigned to a vehicle user are present. "Ideal" may, for example, apply to ergonomic aspects or to peculiarities typical of the driver. For example, while it is ergonomic and corresponds to the requirements with respect to driving safety to operate the steering wheel with bent arms, nevertheless some drivers are used to operating the steering wheel with stretched-out arms, which they consider comfortable. The ideal seat position data take the individual peculiarities into account, as desired by the vehicle user.

In addition, the respective vehicle user is identified and the actual seat position data are adapted to his ideal data. This has the advantage that the ideal seat position can always be provided to the driver in an updated manner. Even if he currently uses a seat cushion or a mobile back support, or if he takes up a different seat position in heavy winter clothing, this is compensated by a corresponding adjustment change, such as a lowering seat surface and/or a moving-back of the entire seat or of the backrest.

Thus, the same rigid preadjustment of the vehicle seat is not always carried out. On the contrary, even temporary individual changes of the current seat position are taken into account and are compensated by changing the seat adjusting data.

As in German Patent Application DE 102 46 318.2, which is not a prior application, the present invention uses a stereoscopic lens system with an assigned image data computer, to determine the actual seat position. In the present invention, however, the seat user is identified and his individual ideal seat position data, as desired data, are not used for the adjusting values of the seat components. On the contrary, these adjusting values are selected such that the actual seat position corresponds to the ideal seat position.

According to the invention therefore, the seat user sits as he sat the last time. In contrast thereto, in the case of a seat memory, the seat is adjusted for the same user in the manner in which it was adjusted the last time.

It is easily possible to use the seat position data also for correspondingly adjusting the front passenger seat when the vehicle user is sitting there and is correspondingly identified.

Advantageous further developments of the method according to the invention are described and claimed herein.

According to another aspect of the invention, the vehicle user may be identified by use of the stereoscopic lens system with the assigned image data computer. The lens system, together with the image data computer, then has multiple functions. It is used, for example, for identifying the vehicle user at the start of the operation of the vehicle and/or during the operation. In addition, the actual seat position is thereby determined and the possibly required change of the seat position carried out by changing the seat adjusting parameters is controlled by optical control.

As described in German Patent Application DE 102 46 318.2, which is not a prior application, the ideal seat position can be determined beforehand. However, for this purpose, it is provided that the vehicle user actually takes up this position in the vehicle. In order to remove the connected uncertainty from the driver as to whether "his" existing position is actually the ideal position, the determination of the ideal seat position values can take place in a manner completely separate from the use of the vehicle, for example, in a suitable measuring apparatus. The resulting position values then only have to be transmitted into the vehicle and be connected with the identification characteristics significant for the user.

Because of small CCD video cameras or digital cameras and image data computers available at low cost, the seat adjusting method according to the invention can be implemented and integrated in motor vehicles in a cost-effective manner.

Referring to the FIGURE, the method according to the present invention starts (step 10) with a determination of an ideal seat position for a vehicle user (step 12). The ideal seat position data is stored in a seat data memory (step 14). The method identifies a respective vehicle user and assigns the ideal seat position data to that user (step 16). When the vehicle uses the vehicle seat, the method determines an actual seat position using an optical system and an image processor (step 18). The optical system may be, for example, a stereoscopic optical element whose signals are processed by an image processor to determine the actual seat position. In particular, CCD video cameras or digital cameras and corresponding image data computers may be cost effectively employed. Thereafter, seat adjustment is performed such that the actual seat position corresponds at least approximately to the ideal seat position (step 20). When the seat adjustment is completed, the method ends (step 22).

In one aspect of the invention, the identification of the respective vehicle user may also occur using the optical system and image processor. In that way, the optical system and image processor provide multiple functions cost effectively.

While the FIGURE illustrates the determination of the ideal seat position (step 12) as part of the adjustment process, it is readily understood that the ideal seat position may be determined prior to operation of the adjustment process. For example, determination of the ideal seat position data may take place in a manner completely separate from the use of a vehicle such as with a specially designed measuring apparatus.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for adjusting a motor vehicle seat, the method comprising the acts of:
   determining an ideal seat position associated with a vehicle user;
   recording the ideal seat position in a seat data memory;
   identifying the vehicle user via an identification device, and associating the ideal seat position of said user therewith;
   determining a first actual seat position of said vehicle user via a stereoscopic optical element in conjunction with an associated image data computer;
   adjusting the motor vehicle seat to a first motor vehicle seat position such that the first motor vehicle seat position corresponds at least approximately to the ideal seat position;
   determining a second actual seat position of said vehicle user via the stereoscopic optical element in conjunction with the associated image data computer; and
   adjusting the motor vehicle seat to a second motor vehicle seat position such that the second motor vehicle seat position corresponds at least approximately to the ideal seat position, wherein the first and second motor vehicle seat positions are different seat positions.

2. The adjusting method according to claim 1, wherein the stereoscopic optical element and associated image data computer are used to identify said user.

3. The adjusting method according to claim 2, wherein the act of determining the ideal seat position data associated with the vehicle user occurs prior to performing the method.

4. The adjusting method according to claim 1, wherein the act of determining the ideal seat position data associated with the vehicle user occurs prior to performing the method.

5. The adjusting method according to claim 1, wherein the ideal seat position defines a spatial relationship between the vehicle user and a component of the vehicle.

6. The adjusting method according to claim 5, wherein the component of the vehicle is a steering wheel.

7. The adjusting method according to claim 6, wherein in the first and second motor vehicle seat positions the vehicle user's arms are in a same position relative to the steering wheel.

8. The adjusting method according to claim 1, wherein when the second actual seat position is determined the vehicle user is sitting on a seat cushion, using a mobile back support, wearing heavy clothing or a shape of the seat has changed.

9. The adjusting method according to claim 8, wherein the second motor vehicle seat position has a lower seat surface, a moved-back seat or reclined backrest relative to the first motor vehicle seat position.

10. A method for adjusting a motor vehicle seat, the method comprising the acts of:
    determining an ideal seat position associated with a vehicle user, wherein the ideal seating position defines a spatial relation between the vehicle user and a component of the vehicle;
    identifying the vehicle user and associating the ideal seat position of said user therewith;
    determining a first actual seat position of said vehicle user via a stereoscopic optical element in conjunction with an associated image data computer;
    adjusting the motor vehicle seat to a first motor vehicle seat position such that the first motor vehicle seat position corresponds at least approximately to the ideal seat position;
    determining a second actual seat position of said vehicle user via the stereoscopic optical element in conjunction with the associated image data computer; and
    adjusting the motor vehicle seat to a second motor vehicle seat position such that the second motor vehicle seat position corresponds at least approximately to the ideal seat position, wherein the first and second motor vehicle seat positions are different seat positions.

11. The adjusting method according to claim 10, wherein the vehicle component is a steering wheel.

12. The adjusting method according to claim 11, wherein in the first and second motor vehicle seat positions the vehicle user's arms are in a same position relative to the steering wheel.

13. The adjusting method according to claim 10, wherein when the second actual seat position is determined the vehicle user is sitting on a seat cushion, using a mobile back support, wearing heavy clothing or a shape of the seat has changed.

14. The adjusting method according to claim 13, wherein the second motor vehicle seat position has a lower seat surface, a moved-back seat or reclined backrest relative to the first motor vehicle seat position.

* * * * *